(12) United States Patent
Smith (10) Patent No.: US 12,478,802 B2
(45) Date of Patent: Nov. 25, 2025

(54) RADIOTHERAPY TREATMENT PLANNING

(71) Applicant: Elekta Limited, Crawley (GB)

(72) Inventor: Adrain Smith, Crawley (GB)

(73) Assignee: Elekta Limited, Crawley (GB)

( * ) Notice: Subject to any disclaimer, the term of this patent is extended or adjusted under 35 U.S.C. 154(b) by 235 days.

(21) Appl. No.: 18/553,036

(22) PCT Filed: Mar. 29, 2022

(86) PCT No.: PCT/EP2022/058297
§ 371 (c)(1),
(2) Date: Sep. 28, 2023

(87) PCT Pub. No.: WO2022/207649
PCT Pub. Date: Oct. 6, 2022

(65) Prior Publication Data
US 2024/0198134 A1    Jun. 20, 2024

(30) Foreign Application Priority Data
Mar. 31, 2021    (GB) ..................................... 2104685

(51) Int. Cl.
*A61N 5/10* (2006.01)
(52) U.S. Cl.
CPC ......... *A61N 5/1036* (2013.01); *A61N 5/1031* (2013.01); *A61N 5/1047* (2013.01); *A61N 5/1048* (2013.01); *A61N 5/1081* (2013.01)
(58) Field of Classification Search
None
See application file for complete search history.

(56) References Cited

U.S. PATENT DOCUMENTS

2009/0213991 A1 * 8/2009 Brown ................... A61N 5/103
378/65
2009/0250618 A1 * 10/2009 Simon ................. A61N 5/1071
250/371

(Continued)

FOREIGN PATENT DOCUMENTS

WO    WO-2007124760 A1 * 11/2007 ............. A61N 5/103
WO    WO-2009052845 A1 * 4/2009 ........... A61N 5/1042

OTHER PUBLICATIONS

"International Application Serial No. PCT/EP2022/058297, International Search Report dated Jul. 21, 2022", (Jul. 21, 2022), 3 pgs.

(Continued)

*Primary Examiner* — Marcus H Taningco
(74) *Attorney, Agent, or Firm* — Schwegman Lundberg & Woessner, P.A.

(57) ABSTRACT

Disclosed herein is a method of calculating delivery values for delivering an arc-segment between two control points of a treatment plan, the treatment plan specifying MLC leaf position at each control point. The method comprises: calculating the arc-segment delivery time for each of a plurality of components using default delivery values, wherein one of the components is MLC leaf movement; selecting the component dictating the longest arc-segment delivery time as the time-limiting component; and if the time-limiting component is MLC leaf movement: providing optimised MLC delivery values; if a predetermined condition is met, setting the time-limiting component delivery values to the optimised delivery values; and outputting the time-limiting component delivery values.

19 Claims, 4 Drawing Sheets

(56) References Cited

U.S. PATENT DOCUMENTS

2010/0329422 A1* 12/2010 Brown ............... A61N 5/1042
378/65
2013/0187062 A1 7/2013 Nord et al.

OTHER PUBLICATIONS

"International Application Serial No. PCT/EP2022/058297, Written Opinion dated Jul. 21, 2022", (Jul. 21, 2022), 6 pgs.

* cited by examiner

Figure 4

RADIOTHERAPY TREATMENT PLANNING

PRIORITY APPLICATIONS

This application is a U.S. National Stage Filing under 35 U.S.C. § 371 from International Application No. PCT/EP2022/058297, filed on Mar. 29, 2022, and published as WO2022/207649 on Oct. 6, 2022, which claims the benefit of priority to British Application No. 2104685.9, filed on Mar. 31, 2021; the benefit of priority of each of which is hereby claimed herein, and which applications and publication are hereby incorporated herein by reference in their entireties.

FIELD

The present disclosure relates to a method of treatment control planning, a treatment control computer and a radiotherapy device comprising the same.

BACKGROUND

Radiotherapy involves the production of a beam of ionising radiation, usually x-rays or a beam of electrons or other sub-atomic particles. a linear accelerator, whereby a tumor is irradiated by high-energy particles (e.g., electrons, protons, ions and the like). The placement and dose of the radiation beam must be accurately controlled so that the radiation dose is maximised in the cancerous cells and minimised in healthy cells of the patient, as this improves the efficiency of treatment and reduces the side effects in a patient.

In a radiotherapy apparatus the beam can be delimited using a beam shaping apparatus which defines an aperture of variable shape to collimate the radiation beam to a chosen cross-sectional shape. A beam shaping apparatus can be formed by a combination of a diaphragm and a 'multi-leaf collimator' (MLC). These can be adjusted during treatment so as to create a beam whose cross-section varies dynamically as it rotates around the patient.

The source of radiation and the multi-leaf collimator are attached to a gantry which is rotatable about the patient in a plane orthogonal to the axis of rotation. The result is that the target remains in the beam at all times, but areas immediately around the target are only irradiated briefly by the beam during part of its rotation. Delivering radiation to the patient from a plurality of angles maximises the radiation dose in cancerous cells and minimises the does in healthy cells of the patient.

A treatment plan is developed based on delivering a specific dose to a target in the patient. Different types of radiotherapy techniques vary different parameters of the beam. Intensity modulated radiotherapy includes radiotherapy techniques which vary the beam delivered to the patient. The elements which can be controlled include the position of the leaves of the multi-leaf collimator, the angle of the gantry, the dose rate of radiation emitted from the source and the velocity of rotation of the source.

Leaf position, rotation angle and dose (dose is determined by velocity of gantry rotation or by dose rate from the source) are defined in the treatment plan. Leaf movement, gantry movement and dose rate can be adjusted to deliver a treatment plan.

SUMMARY

Aspects and features of the present invention are described in the accompanying claims.

According to an aspect there is provided a method of calculating delivery values for delivering an arc-segment between two control points of a treatment plan, the treatment plan specifying MLC leaf position at each control point, the method comprising: calculating the arc-segment delivery time for each of a plurality of components using default delivery values, wherein one of the components is MLC leaf movement; selecting the component dictating the longest arc-segment delivery time as the time-limiting component; and if the time-limiting component is MLC leaf movement: providing optimised MLC delivery values; and if a predetermined condition is met, setting the time-limiting component delivery values to the optimised delivery values, and outputting the determined delivery values.

Optionally, the method further comprises calculating an optimised arc-segment delivery time using the optimised delivery values; and comparing the optimised arc-segment time to the longest arc-segment delivery time to determine whether the predetermined condition is met.

Optionally, the method further comprises if the optimised arc-segment delivery time is longer than the longest arc-segment delivery time, setting the time-limiting delivery values to be the default delivery values; and if the optimised arc-segment delivery time is shorter than the longest arc-segment delivery time, setting the time-limiting delivery values to be the optimised delivery values.

Optionally, the method further comprises providing optimised delivery values comprising: selecting an MLC parameter for the arc-segment delivery; determining if the parameter meets a predetermined requirement; and if the predetermined requirement is met, determining optimised delivery values.

Optionally, the method further comprises determining optimised delivery values comprising selecting optimised delivery values from a look-up table.

Optionally, the method further comprises the MLC parameter comprising one or more of: a thermal load, a current load, a maximum rpm, a motor/gearbox constraint, proximity of opposing leaves and magnitude of relative motion, direction of gravity relative to leaf motion, number of leaves in motion, tumour tracking requirements, magnitude of tracking motion vector.

Optionally, the method further comprises the treatment plan further comprising a gantry position at each control point and a dose for each arc-segment.

Optionally, the method further comprises if the limiting component is not the MLC, setting the time-limiting component delivery value to the respective default delivery value.

Optionally, the method further comprises once the time-limiting component delivery value has been set, for each remaining component, calculating a reduced delivery value to match the arc-segment delivery time of the time-limiting component.

Optionally, the method further comprises the default delivery values including at least one of: maximum leaf velocity; maximum leaf acceleration; maximum gantry rotation velocity; maximum gantry rotation acceleration; and maximum dose rate.

Optionally, the method further comprises repeating the method for each of a plurality of arc-segments of a treatment plan.

Optionally, the method further comprises outputting the determined delivery values to a controller configured to control a radiotherapy apparatus to deliver a treatment plan according to output delivery values.

Optionally the method comprises outputting the determined delivery values to a radiotherapy device.

Optionally, the method further comprises controlling the radiotherapeutic apparatus to operate the components at their respective delivery values.

Optionally, the method further comprises delivering a first arc-segment and a second arc-segment, wherein the radiation is not interrupted between the first arc-segment and the second arc-segment.

Optionally, the method further comprises providing a set of optimised MLC delivery values comprising: for each of a plurality of parameters, determining if the parameter is below a threshold; if all delivery parameters are below the respective threshold, outputting an optimised delivery value from a look-up table.

According to an aspect there is provided a computer readable medium comprising computer-executable instructions configured to perform the method.

According to an aspect there is provided a radiotherapeutic apparatus comprising a source able to emit a beam of therapeutic radiation along a beam axis, a multi-leaf collimator arranged to collimate the beam to a desired shape, wherein the source is rotatable about a rotation axis that is substantially orthogonal to and intersects with the beam axis thereby to describe an arc around that axis, further comprising a planning computer comprising computer-readable instructions configured to, when executed by the planning computer, perform the method.

Optionally, the method further comprises a radiotherapy apparatus comprising a controller configured to control the radiotherapy apparatus to deliver a treatment plan according to output delivery values from the planning computer.

BRIEF DESCRIPTION OF THE DRAWINGS

Specific embodiments are described below by way of example only and with reference to the accompanying drawings in which.

OVERVIEW

MLC leaf speed and acceleration are limited to a 'default maximum' value. These maximums are conservative values, chosen to be attainable under any operating condition (i.e. all the leaves being driven at max speed simultaneously).

If the operating conditions allow, optimisations can be made and the MLC can be driven to a higher speed than the 'default maximum' without damaging the MLC. If the MLC is the "time-limiting component", by optimising values the treatment time is reduced. At the delivery planning stage, parameters relating to the MLC are analysed to determine if an optimised value can be used in place of the default maximum value.

SPECIFIC DESCRIPTION OF CERTAIN EXAMPLE EMBODIMENTS

A method of creating a treatment delivery plan is set out herein.

As explained above, in radiotherapy, radiation is directed towards a cancerous region of a patient (e.g. a tumour). A plan is provided to deliver the correct dose of radiation to the patient, to target the target cells whilst minimising the dose to adjacent healthy cells.

Figure 1:
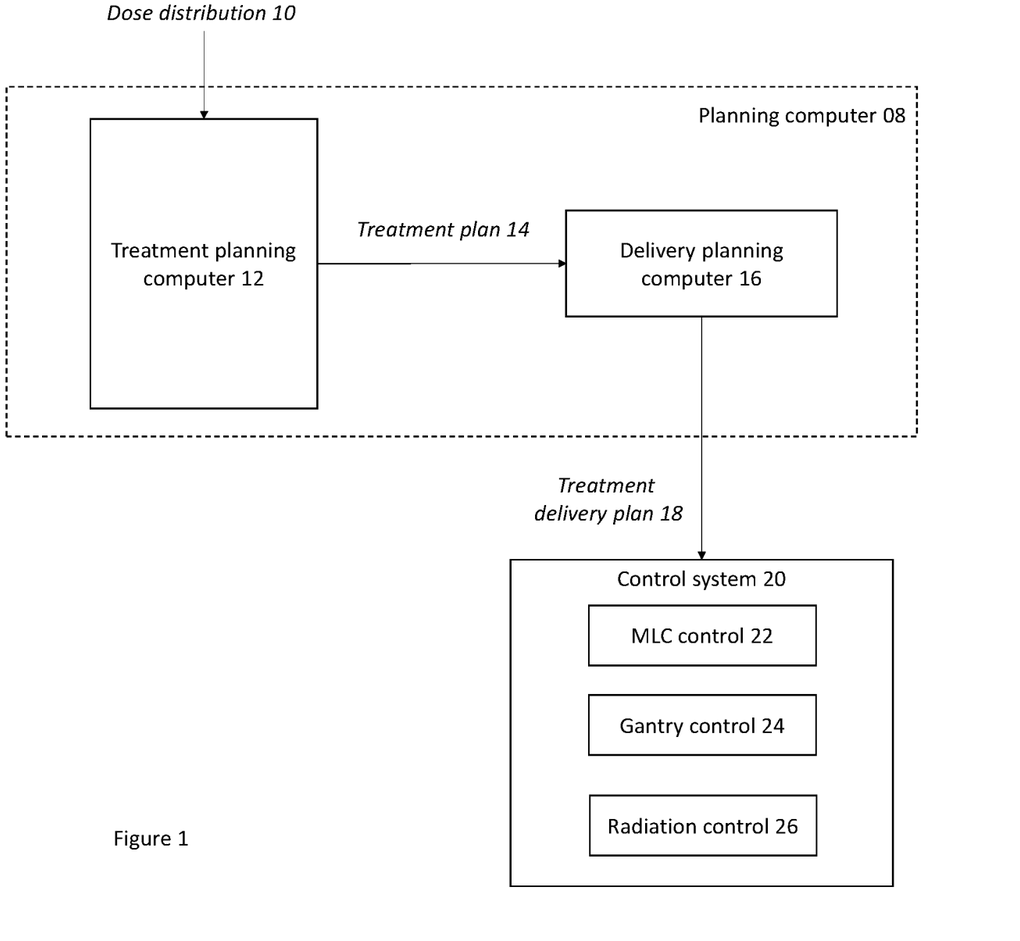
FIG. 1 illustrates a planning computer.

The amount of radiation required to be delivered to a patient in a treatment session is provided into a planning computer in the form of a desired dose distribution 10. A panning computer 08 may include a treatment planning computer 12 and a delivery planning computer 16. Alternatively, the treatment planning computer 12 and the delivery planning computer 16 may be separate entities referred to collectively as a planning computer 08. The dose distribution includes a three-dimensional map showing areas which must receive a specified dose of radiation, such as the lesion itself, areas in which the dose should be minimised to the extent possible, and areas where substantially no radiation or less than a specified dose must be delivered, such as sensitive structures and vital organs.

The treatment planning computer 12 receives the dose distribution 10. The treatment planning computer determines a treatment plan 14 by calculating the necessary rotations, dose rates (dose is plotted against the movement axes, so it is the velocity of a movement that actually defines the dose rate where the amount of dose to be delivered over a particular distance has been defined), and collimator shape for the delivery of the dose distribution to a patient.

The treatment planning computer 12 creates a desired treatment plan in terms of a sequence of control points. Each "control point" defines a position of the gantry, the dose that is to be delivered between this and the next (or previous) control point, and the shape of the MLC at that control point. Each consecutive pair of control points defines (between them) an arc-segment. Control points could (in theory) be spaced strategically around the complete arc. However, the availability of relatively cheap processing power means that there is little benefit in going to the effort of doing so, and control points are therefore typically spaced regularly around the arc such as every degree, every few degrees, or every fraction of a degree.

This treatment is put into effect by, between the nth and the (n+1)th control point, moving the gantry from the position of the nth control point to the position of the (n+1)th control point at a rotation velocity and a dose rate that combine to deliver the required dose, while moving the MLC leaves so that when the gantry is at the (n+1)th control point, the leaves are in the correct position for that point. Typically, the MLC leaves will be moved at a rate which ensures that at all times their distance moved is linearly related to the dose that has been delivered in the arc-segment. This process is then repeated for the arc-segment between the (n+1)th and the (n+2)th control points, and so on until the treatment is complete.

Once the treatment plan 14 has been created it must then be translated into a set of gantry moves, dose rates, and MLC moves to deliver the treatment plan, taking into account the physical constraints of the radiotherapy device. This is done by the delivery planning computer 16.

The delivery planning computer 16 receives the treatment plan 14 from the treatment planning computer 12. The delivery planning computer 16 creates a treatment delivery plan 18 based on the treatment plan 14 and the abilities and constraints of the radiotherapy apparatus in question.

The delivery planning computer 16 comprises or has access to a set of machine constraints of the radiotherapy apparatus. The machine constraints detail the nature of the apparatus including the geometry of the beam and the collimators, maximum dose rates and maximum rotation velocities, etc. An algorithm is then applied to produce a treatment delivery plan 18 comprising detailed instructions for the radiotherapy apparatus in terms of required rotation velocities, dose rates, leaf velocities and their variation with time. The output from the delivery planning computer 16 is, for each arc-segment, calculated values for the dose rate, the gantry movement and the MLC movement to, in combination, deliver the treatment plan. This is the treatment delivery plan 18.

The delivery values are the values for operating the components of a radiotherapy device to deliver a treatment plan. The components of the radiotherapy device are controlled according to the delivery values.

The treatment delivery plan 18 is passed to the control system 20 of the radiotherapy apparatus. The control system includes individual local control units 22, 24, 26 which each control an individual element of the radiotherapy apparatus. In this case, the individual elements are an MLC control 22 (e.g. a plurality of leaf drives), a gantry control 24, such as a gantry rotation drive, and a radiation control 26, such as a dose rate control. The relevant parts of treatment delivery plan 18, for example the relevant delivery values, are passed to the local control units. The local control units then operate the respective elements according to the delivery values, therefore delivering the required dose distribution. Generally, there will be one such control unit for each item, although the functions of some may be combined into a single unit for closely-related geometry items such as MLC leaves. The unit receives the treatment delivery plan (or at least the parts of the plan relating to it) substantially in its entirety at the start of the treatment. This plan sets out the required movement of the geometry item in question during the course of the treatment.

The computers illustrated in FIG. 1 may physically be one or more computers but in this text are considered as distinct functional elements of the system. Such a treatment plan can be implemented on an existing radiotherapy apparatus. The present disclosure relates to the control apparatus and the treatment planning apparatus; the actual radiation head and the means for driving it, its MLC and other systems can be unchanged from those in use. Therefore the treatment delivery planning can be retrofitted onto existing radiotherapy apparatuses.

Constraints

As explained above, the delivery planning computer creates a treatment delivery plan based on the individual abilities and constraints of the radiotherapy apparatus in question. The constraints used when determining the delivery values are referred to herein as 'default values'.

The default values are chosen to ensure the treatment plan can be delivered under all operating conditions. The default values are not set to the absolute maximum value for that component, but are set at values which represent an attainable value for the duration of the treatment. The default values for the MLC include the maximum leaf velocity and maximum acceleration. The default values for the gantry drive include the maximum rotation velocity and the rotation acceleration. The default value for the radiation source is the maximum dose rate. In some implementations the parameter of jerk, the first time derivative of acceleration and second time derivative of velocity, is also considered, with a default value of maximum jerk. However, in low inertia systems jerk might not be considered.

The default values of maximum leaf velocity and acceleration are conservative, in that the values are chosen to be lower than the absolute maximum leaf velocity and acceleration. This is because the defaults values are calculated to be viable in all situations. For example, in situations where:

Each leaf of the multi-leaf collimator is driven simultaneously

The leaves are driven constantly at the maximum velocity

The leaves are driven against gravity.

Additionally, a percentage of the available velocity of the leaves must be maintained for target tracking, so that the leaves can always accelerate if tracking is needed. That is, an amount of velocity should be left available to close positional error.

The maximum velocity is introduced to protect the MLC and to ensure tracking can take place. However, the value is based on a "worst case scenario" and therefore is lower than is necessary in most situations.

Accordingly, in many cases the leaves could be driven faster than the default value. That is, depending on the conditions of a specific portion of treatment, the leaves could be driven more quickly than is reflected in the constraints utilised by the delivery planning computer when preparing the treatment delivery plan. If the time of treatment of delivery of the treatment plan is constrained by the multi-leaf collimator, the length of the delivery could be decreased using a more detailed model of the multi-leaf collimator.

An aim of the invention disclosed herein is to reduce delivery times, which is important for departmental efficiency and to prevent organ motion between imaging and the completion of irradiation.

Figure 2:
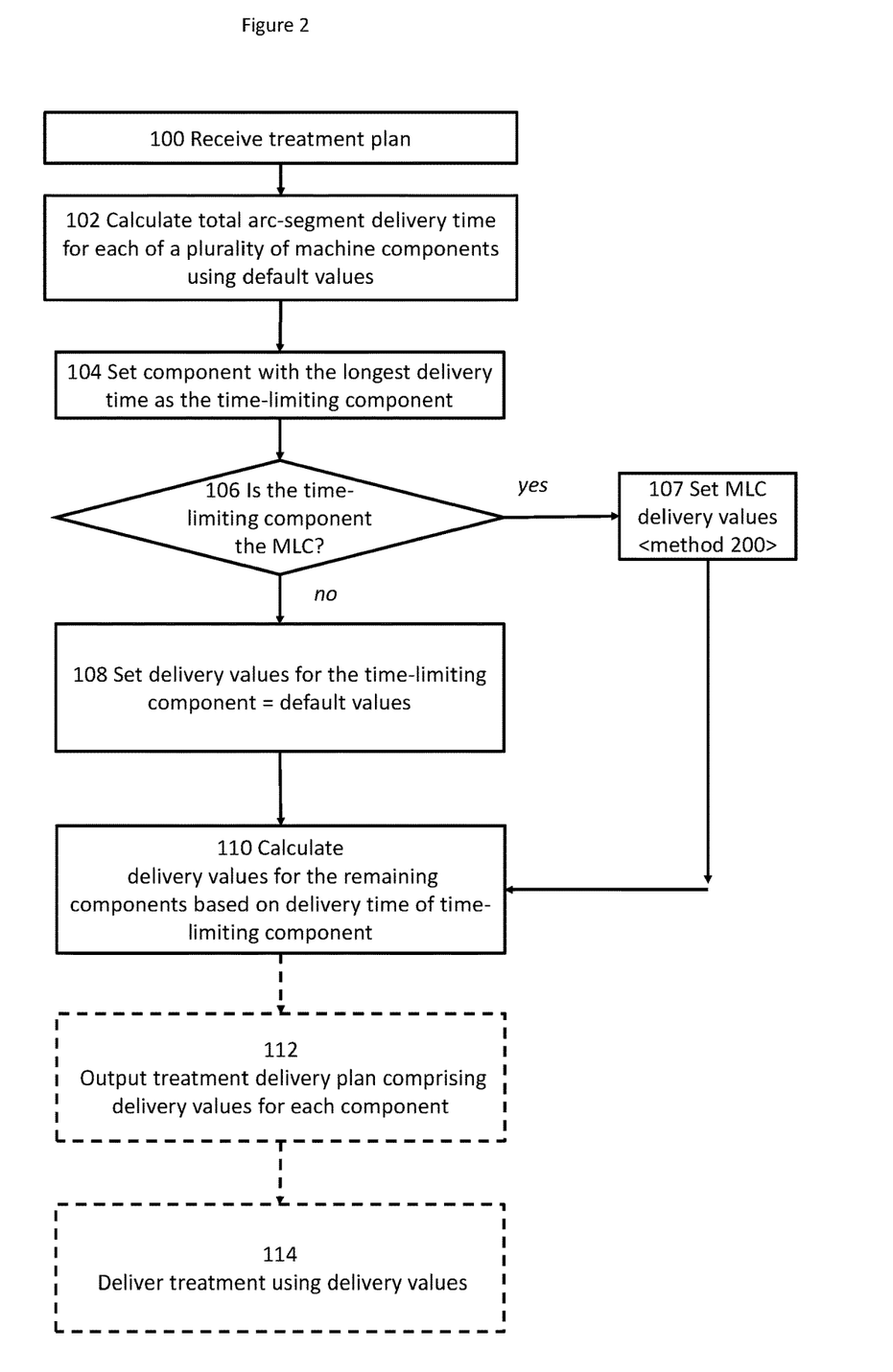
FIG. 2 illustrates a method of calculating delivery values to deliver a dose of radiation according to a treatment plan.

FIG. 2

A method of determining delivery values for delivering a treatment plan is illustrated in FIG. 2. The method is performed by a delivery planning computer, such as delivery planning computer 16.

In the present disclosure steps are introduced to determine whether the MLC is the time-limiting factor in the delivery of a treatment plan. If the MLC is the time-limiting factor, analysis of the delivery is performed in order to determine whether optimisations can be made.

At step 100 the delivery planning computer 16 receives a treatment plan 14 from a treatment planning computer 12. The treatment plan includes a sequence of control points as discussed above. Each control point defines a position of the gantry, the dose that is to be delivered between this and the next (or previous) control point, and the shape of the MLC at that control point. Each consecutive pair of control points defines (between them) an arc-segment. The treatment plan is to be delivered using a radiotherapy device having a plurality of components, or machine components. In the present implementation three components are included: a multi-leaf collimator; a gantry and a source of radiation.

In other implementations the method disclosed herein is used in scenarios in which only two of the abovementioned components are present or considered.

The following steps 102 to 110 are completed for each arc-segment of the delivery plan.

At step 102 the computer uses default values to calculate the time it will take each component to meet the requirements defined for that arc-segment. This is the minimum arc-segment delivery time for each of three components, and the fastest possible delivery time that each component can deliver the arc-segment requirements using the constraints. This includes:

For each leaf of the MLC, calculating the time needed to move the leaf between the control point positions using the maximum leaf velocity and acceleration.

For the gantry, calculating the time needed to rotate the gantry between the control point angles using maximum rotation velocity and maximum rotation acceleration.

For the radiation source, calculating the time needed to deliver the arc-segment dose using the maximum dose rate Table 1 illustrates the information utilised for each of the radiotherapy components. Standard kinematic equations can be used to determine the minimum time. The information in table 1 is an example of kinematics equations which take into account velocity, distance and time. In other examples, other factors are taken into account including acceleration and inertia. The specific equations are determined using kinematics as will be understood by the skilled person.

If the time-limiting component is the radiation source, the delivery value for the dose rate is set to the default maximum dose rate. If the time-limiting factor is the gantry rotation, the delivery values for the gantry are set to the default maximum gantry velocity/acceleration.

The delivery values of the time-limiting component define the delivery time for that arc-segment. The other two components (i.e. the components which are not constraining the delivery time) must be operated at a reduced rate to match the delivery time of the arc-segment.

Once the time-limiting component has been identified and the delivery values for of the time-limiting component have been set, the delivery values for the other components are calculated. The expected delivery time corresponds to the delivery time of the time-limiting factor. At step 110, reduced operating rates of the remaining components are calculated to match with the expected delivery time of the time-limiting component. If the dose is not the time-limiting component, then the desired dose rate can be calculated as follows: Dose rate=arc-segment dose/expected arc-segment time If the gantry is not the limiting component, then the velocities of the gantry can be calculated as follows: Expected gantry velocity=Distance of gantry move/Ex-

TABLE 1

|  | MLC | Gantry | Radiation |
| --- | --- | --- | --- |
| Delivery value | Leaf velocity<br>Leaf acceleration | Gantry rotation velocity<br>Gantry rotation acceleration | Dose rate |
| Control point Information | Position of leaves | Rotation degree | Dose between points |
| Default values | Max velocity<br>Max acceleration | Max rotation velocity<br>Max rotation acceleration | Max dose rate |
| Min time | $\dfrac{\text{distance between points}}{\text{max velocity}}$ | $\dfrac{\text{angle between points}}{\text{max velocity}}$ | $\dfrac{\text{required dose}}{\text{max dose rate}}$ |
| If not limiting factor, to calculate reduced rate | $\text{Reduced leaf velocity} = \dfrac{\text{distance moved in segment}}{\text{delivery time}}$ | $\text{Reduced gantry rotation} = \dfrac{\text{angle moved in segment}}{\text{delivery time}}$ | $\text{Reduced dose rate} = \dfrac{\text{dose}}{\text{delivery time}}$ |

The fastest possible time that the radiotherapy device can deliver the arc-segment is the highest of all of the calculated minimum delivery times. At step 104, the largest of the minimum delivery times is selected. The component which provides the largest minimum delivery time is selected as the time-limiting component. This is the component of the radiotherapy device which is constraining the delivery time of the arc-segment; i.e. it is the time-limiting component. This may be the gantry, dose or any of the MLC leaves. The time-limiting component can change from segment to segment.

At step 106 the computer determines whether the time-limiting component is the MLC. If the MLC is the time-limiting component, the method moves to step 107. If the time-limiting components is not the MLC, for example if the gantry or the radiation source is the time-limiting component, the method moves to step 108.

At step 108 the delivery value(s) for the time-limiting component are set. The delivery values are set to the default values. Each component may have delivery values (for example acceleration and velocity) defined, or may have a singular default value (for example a singular dose rate) defined. For clarity herein the plural "delivery values" is used, however this is understood to not be limiting.

pected arc-segment time If the gantry is not the limiting component, then the velocities of the gantry can be calculated as follows: Expected leaf velocity=Distance of leaf movement/Expected arc-segment time Accordingly delivery values for each of the components (the time-limiting component and each of the remaining components) are set.

The above calculations are simplified calculations in which velocity is considered. In some implementations the calculations given above are used. However it will be appreciated that in some implementations acceleration and inertia are taken into account. The equations used may vary from those above and can be determined using kinematics, as will be understood by the skilled person.

To take inertia into account, those factors that have an inertia-related aspect to their modelling can first be modelled using a simple and straightforward linear relationship, and a predicted time for the segment obtained. In addition, for each segment the an 'Inertia Compensation Time' (ICT) is determined and compared with this time. The greater of these is then used as the relevant time for that factor over the segment in the above comparison, to determine the rate limiting factor for that segment. If that time thus chosen for the segment is an ICT, this will mean that all relevant factors will be scaled back accordingly. The non-rate-limiting factors will be scaled back as previously, so that their total time for the segment corresponds to the segment time. The speed of the rate-limiting factor will then also be scaled back so that it completes the segment at less than its maximum speed, at a lower speed that allows time for inertia compensation to take place.

There are a number of different ways in which the ICT can be determined. Ideally, it will be determined for each geometry item in each instance by calculating the ICT for the particular instance concerned based on prior knowledge of the dynamics of the particular system. Other examples, such as a deceleration. acceleration from a non-zero speed to the maximum speed, and acceleration to a speed less than the maximum are also calculable using analogous approaches.

Alternatively, it is possible to measure the ICT of the specific example of accelerating a geometry item from rest to its maximum speed in the particular system concerned, and to adopt that as a basic ICT for the acceleration of the item from rest to its maximum speed. Other ICT values can then be determined by a straightforward scaling process applied. Alternatively, given that all the ICTs are likely to be relatively small, a default ICT can be adopted and used for all geometry items of that type in that system. Provided that a maximal ICT is adopted as the default, this will ensure that a conservative approach is taken in which all geometry items are offered sufficient time to compensate for inertia. It has the difficulty that where the actual ICT is less than the default ICT, the dose rate will be scaled down more than is necessary, thereby lengthening the treatment. In practice, however, the effect of this is likely to be small whereas the use of a default ICT simplifies matters.

The steps shown in dashed lines in FIG. 2 illustrate optional additional steps. A table of delivery values is output from the delivery planning computer to the control system 20, or to a storage device or user interface. The values are then saved to be implemented when the treatment plan is delivered.

At step 112 the computer outputs the delivery values for each of the components. The values could be output to a controller, a control computer, or to a display device. The values could be outputted to a radiotherapy device, or to a controller of a radiotherapy device for controlling or configured to control the radiotherapy device according to the delivery values.

At step 114, the treatment plan is delivered by controlling the components according to the output delivery values.

Step 106 is implemented to determine optimised delivery values in the situation where the MLC is the limiting factor. As explained above, the default maximum velocity and acceleration values are chosen for the MLC to be applicable in any scenario. The values must account for the most demanding MLC operating parameters. In most situations, the operating parameters will be less taxing that the "worst case" scenario, and therefore the MLC can be operated at higher velocities or accelerations than the default maximum values.

Figure 3:
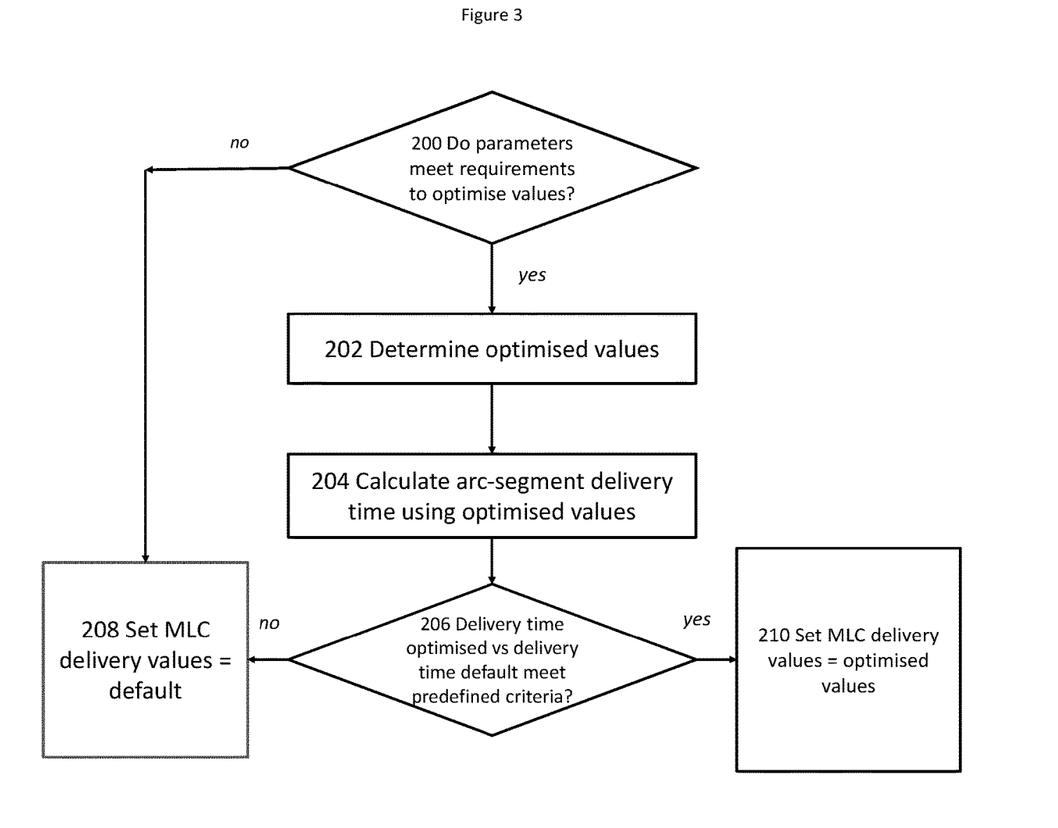
FIG. 3 illustrates a method of optimising MLC delivery values.

In the method, if the time-limiting factor is the MLC, the method moves to step 107 to set the MLC delivery values. This is done as illustrated in the method of FIG. 3. Once the MLC delivery values have been set, per the method of FIG. 3, the process continues to step 110. The delivery values for the remaining components (the gantry and the radiation source) are calculated to match the expected arc-segment delivery time using the set MLC delivery values.

FIG. 3

FIG. 3 illustrates a method of optimising MLC delivery values. The method is performed by a delivery planning computer, such as delivery planning computer 16, and begins at method step 107 from FIG. 2.

Once it has been determined that the MLC is the time-limiting component for the delivery of the arc-segment, the operating parameters of the MLC within the context of the delivery plan are analysed to determine whether optimisations can be made. The computer analyses whether the operating parameters meet certain requirements.

The parameters evaluated include one or more of: thermal load, current load, proximity of opposing leaves, number of leaves, direction of gravity, drive voltage, tracking.

If it is determined that the parameters do not meet the requirements to set optimised values, the method proceeds to step 208 and the MLC delivery values are set to be the default values.

Figure 4:
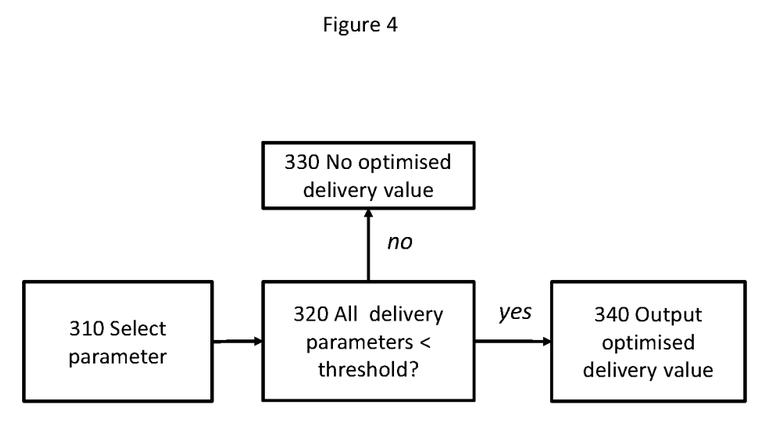
FIG. 4 illustrates a method of providing optimised delivery values.

If it is determined that the parameters meet the requirements and then it is possible to increase the delivery values of the MLC within the operational limits, optimised values can be calculated. The optimised values are calculated at step 202. Optimised values are determined to utilise the MLC resources. The optimised values may be determined using a look-up table. An example of determining whether the delivery values can be optimised (step 200) and determining the optimised values (step 202) is illustrated in FIG. 4.

Once the optimised values have been calculated, at step 204 the optimised values are used to calculate the arc-segment delivery time. This is the time it would take the MLC to deliver the arc-segment if it is operated using the optimised values.

At step 206, this 'optimised delivery time' (the time to deliver the arc-segment using optimised values) is compared to the 'default delivery time' (the time to deliver the arc-segment using the default values). If the optimised delivery time meets a pre-defined criteria, for example if it provides a significant improvement on the delivery time using the default values, the MLC delivery values will be updated to the optimised values.

At step 206 it is determined whether the difference between the optimised delivery time and the default delivery time meets a predefined criteria. Examples of a predefined criteria include:

The optimised delivery time is less than the default delivery time

The optimised delivery time is less than the default delivery time more than a predetermined amount of time: e.g. by more than 5 seconds The optimised delivery time is less than the default delivery time more than a predetermined proportion e.g. by more than 5%

The predefined criteria is set prior to the treatment control planning and stored in the treatment control computer.

If the predefined criteria is met, it is deemed to be worth updating the delivery values to the optimised values. The computer then sets the MLC delivery values to the optimised values at step 210. These delivery values are output and as the time-constraining component delivery values to step 110 of the method in FIG. 2. The delivery values for the radiation source and the gantry rotation are then calculated using the optimised delivery time at step 110.

If, at step 206, it is determined that the predefined criteria is not met, the method continues to step 208 and the computer sets the MLC delivery values to be the default values. These delivery values are output and as the time-constraining component delivery values to step 110 of the method in FIG. 2. The delivery values for the radiation source and the gantry rotation are then calculated using the defualt delivery time at step 110.

FIG. 4

FIG. 4 shows a method of evaluating the MLC to determine optimised values. FIG. 4 is a more detailed implementation of the first two steps, step 200 and step 202, of the method in FIG. 3. A number of parameters of the MLC are taken in turn. If any of the parameters meet a predetermined requirement, it is determined that the relevant parameters can be 'optimised'. The optimised value is determined using, for example, a look-up table.

At step 310, the parameters relating to the MLC are considered. Examples of the parameters to consider are listed below.

MLC Parameters

1) Thermal load of motors, motor drive boards/circuits and motor drive power supplies.
2) Current load of motors, motor drive boards/circuits and motor drive power supplies.
3) Other motor/gearbox constraints such as maximum rpm
4) Proximity of opposing leaves and magnitude of relative motion
5) Direction of gravity relative to leaf motion
6) Number of leaves in motion (Can be used as a simpler proxy for 1) and 2)
7) Additional field complexity factors e.g. Tumour Tracking, magnitude of tracking motion vector Each parameter is used to determine whether that parameter meets a predetermined requirement, which indicates an optimisation can be made. In some examples the parameter is compared to a threshold to determine if optimisations can be made 320. If the parameters meet the criteria, for example is above or below the threshold, then an optimised value is set 340. A sub-selection of the parameters listed above, for example one or more of the parameters listed above, or all of the parameters listed above may be considered. It is not essential to consider all criteria to implement the present method. However the fewer criteria which are considered at this stage reduces the space available for future optimisation.

Examples of the predetermined criteria for each of the parameters are below. These criteria are examples only, and in other examples different criteria are used.

| MLC parameter | Criteria for optimisation |
| --- | --- |
| Thermal load of motors, motor drive boards/circuits and motor drive power supplies | Thermal load below threshold value |
| Current load of motors, motor drive boards/circuits and motor drive power supplies | Current load below threshold value |
| Other motor/gearbox constraints such as maximum rpm | Maximum rpm below threshold value |
| Proximity of opposing leaves and magnitude of relative motion | Proximity of leaves above threshold value |
| Direction of gravity relative to leaf motion | Direction of gravity relative to leaves below threshold angle |
| Number of leaves in motion (Can also be used as a simpler proxy for 1) and 2)) | Number of leaves below threshold value |
| Additional field complexity factors e.g. Tumour Tracking, magnitude of tracking motion vector | % of movement required for tracking purposes below threshold value |

Once it has been determined that the predetermined requirement has been met and that an optimisation can be made, an optimised value is determined. The optimised value can be determined using, for example, a look-up table stored on the computer. The method proceeds to step 204 in the method of FIG. 3.

If the parameters do not meet the criteria at step 320, the method moves to step 330 and no optimised delivery value is set. The method proceeds to step 208 of FIG. 3.

Accordingly there is provided a method for treatment delivery planning, wherein MLC delivery values are optimised if certain conditions are met. This allows the constraints of the MLC to be treated adaptively depending on the context of the MLC movement in the treatment plan. Accordingly the MLC movement can be optimised, hence reducing treatment plan delivery times.

There is provided a method of determining delivery values for delivering a treatment plan, and a computer-readable medium configured to perform the method. There is also provided a system configured to determine delivery values for delivering a treatment plan, and a radiotherapy apparatus comprising the system.

Features of the above aspects can be combined in any suitable manner. It will be understood that the above description is of specific embodiments by way of aspect only and that many modifications and alterations will be within the skilled person's reach and are intended to be covered by the scope of the appendant claims.

The invention claimed is:

1. A method of calculating delivery values for delivering an arc-segment between two control points of a treatment plan, the treatment plan specifying a multi-leaf collimator (MLC) leaf position at each control point, the method comprising:

calculating an arc-segment delivery time for each of a plurality of components using one or more default delivery values, wherein a particular component of the plurality of components is a MLC leaf movement;

selecting a component dictating a longest arc-segment delivery time as a time-limiting component; and when the time-limiting component is the MLC leaf movement:
- providing one or more optimized optimised MLC delivery values;
- when a predetermined condition is met, setting one or more delivery values of the time-limiting component delivery values to the one or more optimized MLC optimised delivery values; and
- outputting the one or more delivery values of the time-limiting component delivery values.

2. The method according to claim 1, further comprising:
calculating an optimized arc-segment delivery time using the one or more optimized MLC delivery values; and
comparing the optimized arc-segment delivery time to the longest arc-segment delivery time to determine whether the predetermined condition is met.

3. The method according to claim 2, further comprising:
when the optimized arc-segment delivery time is longer than the longest arc-segment delivery time, setting the one or more delivery values of the time-limiting component to be the one or more default delivery values; and
when the optimized arc-segment delivery time is shorter than the longest arc-segment delivery time, setting the one or more delivery values of the time-limiting component to be the one or more optimized MLC delivery values.

4. The method of claim 1, wherein providing the one or more optimized MLC delivery values comprises:
selecting an MLC parameter for the arc-segment delivery time;
determining whether the MLC parameter meets a predetermined requirement; and
when the predetermined requirement is met, determining the one or more optimized MLC delivery values.

5. The method of claim 4, wherein determining one or more optimized MLC delivery values comprises selecting optimized delivery values from a look-up table.

6. The method of claim 4, wherein the MLC parameter comprises one or more of: a thermal load, a current load, a maximum rpm, a motor/gearbox constraint, proximity of opposing leaves and magnitude of relative motion, direction of gravity relative to leaf motion, number of leaves in motion, one or more tumor tracking requirements, or a magnitude of a tracking motion vector.

7. The method according to claim 4, wherein when the time-limiting component is not the MLC parameter, the method further comprises:
setting the one or more delivery values of the time-limiting component to the one or more default delivery values.

8. The method according to claim 1, wherein the treatment plan further comprises a gantry position at each control point and a dose for each arc-segment.

9. The method according to claim 1, wherein, once the one or more delivery values of the time-limiting component have been set, the method further comprises:
for each remaining component, calculating a reduced delivery value to match the arc-segment delivery time of the time-limiting component.

10. The method according to claim 1, wherein the one or more default delivery values include at least one of: a maximum leaf velocity; a maximum leaf acceleration; a maximum gantry rotation velocity; a maximum gantry rotation acceleration; or a maximum dose rate.

11. The method according to claim 1, further comprising:
repeating the method for each of a plurality of arc-segments of a treatment plan.

12. The method according to claim 1, further comprising:
outputting the one or more delivery values of the time-limiting component to a controller for controlling a radiotherapy apparatus to deliver a treatment plan according to outputted one more delivery values of the time-limiting component.

13. The method according to claim 12, further comprising:
controlling the radiotherapy apparatus to operate the plurality of components at their respective delivery values.

14. The method according to claim 13, comprising:
delivering a first arc-segment and a second arc-segment, wherein radiation is not interrupted between the first arc-segment and the second arc-segment.

15. The method according to claim 1, wherein providing a set of optimized MLC delivery values comprises:
for each of a plurality of delivery parameters, determining whether a particular parameter is below a threshold; and
when all delivery parameters of the plurality of delivery parameters are below the threshold, outputting an optimized delivery value from a look-up table.

16. A non-transitory computer readable medium comprising computer-executable instructions that, when executed by a processor of a computing device cause the processor to:
calculate an arc-segment delivery time for each of a plurality of components using one or more default delivery values, wherein a particular component of the plurality of components is a multi-leaf collimator leaf movement;
select a component dictating a longest arc-segment delivery time as a time-limiting component; and
when the time-limiting component is the multi-leaf collimator leaf movement:
- providing one or more optimized multi-leaf collimator delivery values;
- when a predetermined condition is met, setting one or more delivery values of the time-limiting component to the one or more optimized multi-leaf collimator delivery values; and
- outputting the one or more delivery values of the time-limiting component.

17. The non-transitory computer readable medium of claim 16, wherein the computer-executable instructions cause the processor to:
calculate an optimized arc-segment delivery time using the one or more optimized multi-leaf collimator delivery values; and
compare the optimized arc-segment delivery time to the longest arc-segment delivery time to determine whether the predetermined condition is met.

18. A radiotherapeutic apparatus comprising:
a source to emit a beam of therapeutic radiation along a beam axis;
a multi-leaf collimator (MLC) arranged to collimate the beam to a desired shape, wherein the source is rotatable about a rotation axis that is substantially orthogonal to and intersects with the beam axis thereby to describe an arc around that axis; and a planning computer comprising non-transitory computer-readable instructions configured to, when executed by the planning computer, cause the planning computer to:

calculate an arc-segment delivery time for each of a plurality of components using one or more default delivery values, wherein a particular component of the plurality of components is an MLC leaf movement;

select a component dictating a longest arc-segment delivery time as a time-limiting component; and when the time-limiting component is the MLC leaf movement:
    providing one or more optimized MLC delivery values;
    when a predetermined condition is met, setting one or more delivery values of the time-limiting component to the one or more optimized MLC delivery values; and outputting the one or more delivery values of the time-limiting component.

19. The radiotherapeutic apparatus according to claim 18, further comprising:

a controller configured to control the radiotherapeutic apparatus to deliver a treatment plan according to output the one or more delivery values of the time-limiting component from the planning computer.

\* \* \* \* \*